United States Patent
Liu et al.

(10) Patent No.: US 8,693,360 B2
(45) Date of Patent: Apr. 8, 2014

(54) METHOD AND ARRANGEMENT FOR A COMMUNICATION NETWORK FOR PERFORMING HANDOVER DECISIONS

(75) Inventors: Jinhua Liu, Beijing (CN); Rong Hu, Sollentuna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 12/999,715

(22) PCT Filed: Jun. 24, 2008

(86) PCT No.: PCT/SE2008/050750
§ 371 (c)(1),
(2), (4) Date: Dec. 17, 2010

(87) PCT Pub. No.: WO2009/157821
PCT Pub. Date: Dec. 30, 2009

(65) Prior Publication Data
US 2011/0096692 A1     Apr. 28, 2011

(51) Int. Cl.
*G01R 31/08* (2006.01)
(52) U.S. Cl.
USPC ............ 370/252; 455/436; 455/437; 455/438
(58) Field of Classification Search
USPC ................. 370/252, 329–335; 455/436–438, 455/435.2, 456
See application file for complete search history.

(56) References Cited

U.S. PATENT DOCUMENTS

| 2005/0221828 | A1 | 10/2005 | Wakuta et al. | |
|---|---|---|---|---|
| 2006/0030323 | A1* | 2/2006 | Ode et al. | 455/436 |
| 2009/0028112 | A1* | 1/2009 | Attar et al. | 370/332 |

FOREIGN PATENT DOCUMENTS

| EP | 0966173 A1 | 12/1999 |
|---|---|---|
| WO | 95/35006 | 12/1995 |
| WO | 98/37719 | 8/1998 |
| WO | 2007/025970 A1 | 3/2007 |

* cited by examiner

*Primary Examiner* — Andrew Chriss
*Assistant Examiner* — Peter Mak
(74) *Attorney, Agent, or Firm* — Coats & Bennett, PLLC

(57) ABSTRACT

The present invention is related to a method and arrangement for performing handover decisions in a communication network, wherein the handover decisions are related to user equipment receiving packet data on a shared downlink traffic channel from a current serving cell. The method comprises the steps of providing (381, 382) a quality measure related to the shared downlink traffic channel of the serving cell and to at least one target cell, determining (383) a relation between the quality measure related to the shared downlink traffic channel of the serving cell and the target cell, and performing the handover decision based on said determined relation and based on the size of the provided quality measure related to the shared downlink traffic channel of the serving cell.

19 Claims, 3 Drawing Sheets

METHOD AND ARRANGEMENT FOR A COMMUNICATION NETWORK FOR PERFORMING HANDOVER DECISIONS

TECHNICAL FIELD

The present invention relates to a method and arrangement for performing handover decisions in a communication network, in particular in a $3^{rd}$ generation telecommunication system including High Speed Downlink Packet Access.

BACKGROUND

In a $3^{rd}$ generation telecommunication system including the feature of High-Speed Downlink Packet Access (HSDPA), e.g. as described in the document 3GPP TR 25.848: "Physical Layer Aspects of UTRA High Speed Downlink Packet Access" issued by the $3^{rd}$ Generation Partnership Project (3GPP), each user equipment (UE) is allocated a dedicated channel (DPCH) in both directions to exchange higher layer signalling information for example between user equipment and Radio Network Controller (RNC).

In order to handle high loads in a cell for example due to a large number of
HSDPA users in said cell, the concept of a Fractional Dedicated Physical Channel (F-DPCH) has been introduced in release 6 of the 3GPP specifications for $3^{rd}$ generation telecommunication systems. The F-DPCH is arranged to carry TPC (Transmit Power Control) commands of several HSDPA users for power control. The channels for TPC commands for the users are time multiplexed in the F-DPCH. The corresponding signalling radio bearers (SRB) arranged to carry radio resource control (RRC) related information when using F-DPCH, are mapped on a High Speed Downlink Shared Channel (HS-DSCH). The radio resource control (RRC) related information relates for example to cell change, active set update, RB reconfiguration, etc.

As is understood from the above, the signalling bearers are sent to the user equipment on the High Speed Downlink Shared Channel (HS-DSCH) when F-DPCH is used. However, this channel does not support soft handover. This can in some cases lead to the situation that the signalling radio bearer can be lost due to poor HS-DSCH reception quality at the user equipment. The uplink quality, e.g. for the UL SRB:s, on the other hand, can still be sufficient since both DCH and E-DCH can gain from the benefits of the soft handover operation. As mentioned above, the signalling radio bearers (SRB) can carry vital radio resource control (RRC) related information such as active set update, cell change, radio bearer reconfiguration etc (see for example the document 3GPP TS25.311: "Radio Resource Control Protocol Specification (FDD)"). This means that the loss of a downlink signalling radio bearer (SRB) can lead to unnecessary SRB retransmissions, call drops, loss of handover commands, and increased delay in scheduling the user in a new HS-DSCH serving cell.

WO 2007/025971 discloses a method for executing handover, wherein radio resource messages are bi-casted through both current serving cell and target cell during handover.

SUMMARY

One object of the present invention is to solve at least some of the problems discussed above so as to ensure signal radio bearer transmission reliability in a communication network, if possible.

This has in one example been achieved by means of a method for performing handover decisions in a communication network, wherein the handover decisions are related to user equipment receiving packet data on a shared downlink traffic channel from a current serving cell. The method comprises the steps of providing a quality measure related to the shared downlink traffic channel of the serving cell and to the at least one target cell, determining a relation between the quality measure related to the shared downlink traffic channel of the serving cell and the target cell, and performing the handover decision based on said determined relation and based on the size of the provided quality measure related to the shared downlink traffic channel of the serving cell.

As the size of the provided quality measure related to the shared downlink traffic channel of the serving cell is taken into account when performing handover decisions, the handover can be performed before the quality of the shared downlink traffic channel becomes unacceptably low. The acceptable quality for signal radio bearer transmission can be estimated based on for example signal radio bearer transport block size and available power in the serving cell, and thus an adequate estimate for the acceptable quality can be provided.

In one example, the handover decision step comprises the steps of deciding to perform handover if the determined relation exceeds a predetermined first threshold value, and if said predetermined first threshold value is not exceeded, performing the handover decision also based on the size of the quality measure related to the shared downlink traffic channel of the serving cell.

In one example, performing the handover decision based on the size of the quality measure related to the shared downlink traffic channel of the serving cell comprises performing a decision not to perform handover if the size of the quality measure related to the shared downlink traffic channel of the serving cell exceeds a predetermined third threshold value. If on the other hand, the quality measure related to the shared downlink traffic channel of the serving cell does not exceed the predetermined third threshold value, the step of performing handover decisions comprises deciding to perform handover if the determined relation exceeds a predetermined second threshold value. The second threshold value is lower than the first threshold value.

The step of providing a quality measure related to the shared downlink traffic channel of the serving cell and at the least one target cell comprises in one example providing the quality measure of the serving cell and the target cell from measurement reports from the user equipment. The step of providing a quality measure related to the shared downlink traffic channel of the serving cell and the at least one target cell can also comprise providing the quality measure related to the shared downlink traffic channel of the serving cell and to the target cell from a channel quality indicator (CQI) related to the user equipment.

The shared downlink traffic channel comprises in one example a High Speed Downlink Shared Channel, HS-DSCH, in a Wideband Code Division Multiplex system.

Embodiments herein also include an arrangement for performing handover decisions in a communication network. The arrangement is for example comprised in a radio access network node such as a radio network controller or a radio base station (Node B). In one example, the arrangement is comprised in user equipment.

DETAILED DESCRIPTION

Figure 1:
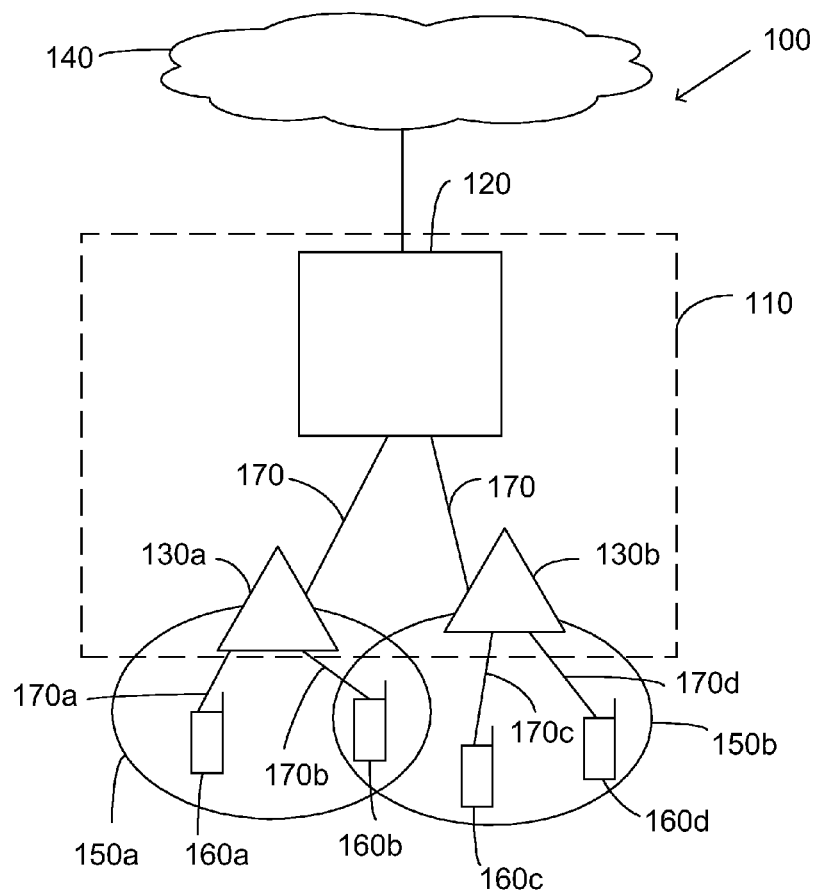
FIG. 1 shows schematically a communication system.

In FIG. 1, a communication system 100 comprises a Radio Access Network (RAN) 110, and a Core network (CN) 140. The RAN 110 comprises at least one Radio Base Station (RBS) (or Node B) 130a, 130b connected to one or more Radio Network Controllers (RNCs) 120 connecting to the CN 140. The RBSs 130a, 130b each serve one or a plurality of cells 150a, 150b. The RAN 110 and the CN 140 provide communication and control for user equipment (UE) 160a, . . . , 160d present within said cells 150a, 150b. The communication and control is provided by means of downlink (DL) channels and uplink (UL) channels.

The communication system is in the herein described example a $3^{rd}$ generation telecommunication system including the feature of High-Speed Downlink Packet Access (HS-DPA). Each user equipment (UE) 160a, . . . , 160d is in accordance with this example allocated a Decicated Physical Channel (DPCH) 170a, . . . , 170d in both the uplink (UL) direction and the downlink direction (DL) so as to exchange higher layer signalling information for example between the user equipment (UE) and the Radio Network Controller (RNC).

Further, a Fractional Dedicated Physical Channel (F-DPCH) can be used so as to increase capacity by reducing code usage in the DL. The Downlink (DL) Associated Dedicated Physical Channel (A-DPCH) can then be removed. The F-DPCH is arranged to carry TPC (Transmit Power Control) commands of several HSDPA users for power control. The channels for TPC commands for the users are time multiplexed in the F-DPCH. The corresponding signalling radio bearers (SRB) arranged to carry radio resource control (RRC) related information when using F-DPCH, are mapped on a High Speed Downlink Shared Channel (HS-DSCH). The radio resource control (RRC) related information relates for example to cell change, active set update, radio bearer reconfiguration, etc.

If the reception quality at the user equipment is poor, the signalling radio bearer (SRB) can be lost due to poor HS-DSCH. Loss of signalling radio bearers can lead to unnecessary SRB retransmissions, call drops and increased delay in scheduling the user in a new HS-DSCH serving cell.

Figure 2:
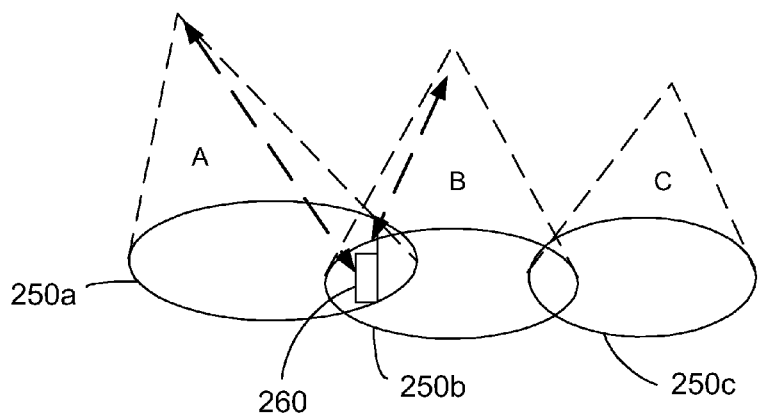
FIG. 2 illustrates three cells in the communication systems of FIG. 1.

In FIG. 2, three HS-DSCH cells 250a, 250b, 250c are depicted, wherein cell A acts as HS-DSCH serving cell for a user equipment 260. As the user equipment 260 moves towards cell B, the RAN 110 needs to switch the HS-DSCH serving cell to Cell B. This operation is network-controlled. The operation is in one example so controlled that the RNC triggers HS-DSCH serving cell change before DL channel quality of the HS-DSCH serving cell is unacceptably low. The acceptable DL channel quality for SRB transmission can be estimated based on usable SRB transport block size and/or available HS-DSCH power in the HS-DSCH serving cell, which will be described in detail later. There are different ways of measuring the quality of the DL channel. In one example, the user equipment is arranged to provide measurement reports. Different triggers for these measurements exist. In one example the measurement reports are event triggered. In an alternative example, the measurement reports are periodically triggered. The triggering of the measurement reports is in one example controlled by means of measurement control messages from a higher layer. In one example, the CPICH Ec/Io measure represents a measure for the channel quality of the HS-DSCH serving cell and the other cells available for the user equipment 260.

Those cells which are available for the user equipment 260 are defined as an active set (AS). Accordingly, in FIG. 2 the active set comprises the cells A,B.

Figure 3:
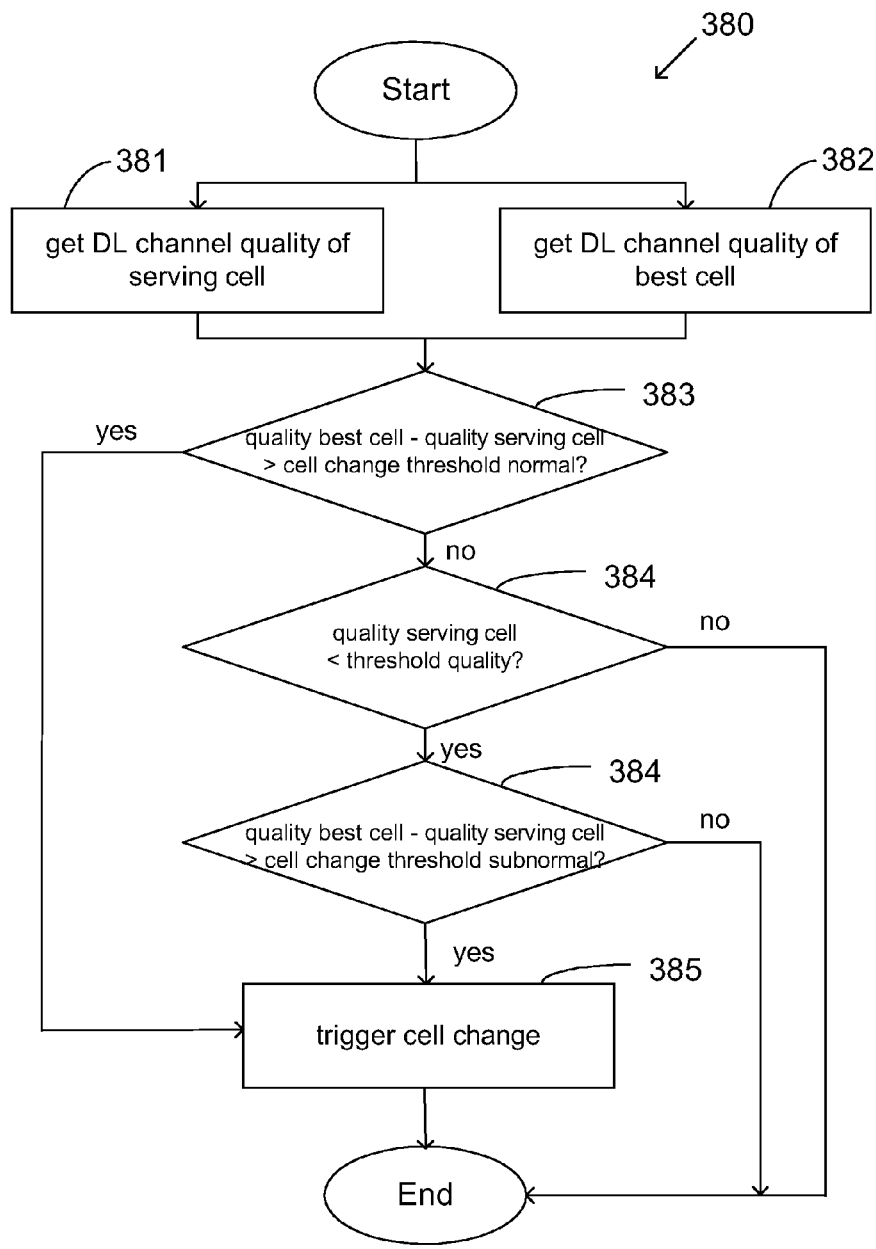
FIG. 3 is a flow chart illustrating the procedure in the communication system in FIG. 1 for performing handover decisions.

In FIG. 3, a procedure 380 performed at the RNC for performing handover decisions comprises the following steps. In a first step 381, a measure of the DL channel quality of the serving cell is provided. Further, in a second step 382, a corresponding measure of the DL channel quality of the best cell in the active set is provided. On one example, the RNC is arranged to identify the best cell based on the received measurement reports. In one example, the first and second steps 281, 382 are performed in parallel. In an alternative example, the first and second steps are performed serially in arbitrary order. The measure of the DL channel quality is in one example provided by means of a measurement report received from the user equipments. In one example, said measurement reports are provided by means of the uplink channel from the serving cell and the other cells of the active set. In one example, the DL channel quality is determined based on Ec/Io and/or RSCP of the Common Pilot Channel (CPICH). The Ec/Io and/or RSCP of the Common Pilot Channel (CPICH) are defined in detail in for example document 3GPP 25.215. CPICH RSCP represents the received signal code power in the Common Pilot Channel. CPICH Ec/Io represents the received signal code power in the Common Pilot Channel divided with the power density in the applicable frequency band. Alternatively, the Node B is arranged to report the Channel Quality Indicator (CQI) (filtered) to the RNC.

In one example, Node B is arranged to send the report when the user unit suffers unacceptably low channel quality. This latter method of providing measurement reports is faster and more accurate than the first mentioned method.

In a third step 383, the channel quality of the serving cell is determined in relation to the channel quality of the best cell. In one example, the relation is determined by means of determining a difference between the channel quality of the serving cell and the best cell in the active set (AS) as $q_{best\ cell\ in\ AS} - q_{serving\ cell}$. The determined relation is then compared with a preset value $\text{CellChangeThreshold}_{normal}$. The preset value is in one example 3 dB. Thus, in one example, it is determined if $$q_{best\ cell\ in\ AS} - q_{serving\ cell} > \text{CellChangeThreshold}_{normal}$$

If the relation between the channel quality of the best cell and the serving cell is such that the preset value is exceeded, then a cell change for the DL channel is triggered (sixth step 386 in FIG. 3). If on the other hand, the relation between the channel quality of the best cell and the serving cell is such that the preset value is not exceeded, the quality measurer of the serving cell is evaluated in a fourth step 384. In one example, the evaluation is performed such as the quality value for the serving cell $q_{serving\ cell}$ is compared with an acceptable quality value $q_{threshold}$. If the quality of the serving cell $q_{serving\ cell}$ is determined to be higher than the predetermined quality value $q_{threshold}$, then a cell change is not triggered. The procedure ends. If on the other hand, the quality of the serving cell $q_{serving\ cell}$ is determined to be lower than the predetermined quality value $q_{threshold}$, there is a risk that radio signal bearer transmission will fail, and then evaluation proceeds in a fifth step 385.

In the fifth step 385, the channel quality of the serving cell is determined in relation to the channel quality of the best cell again. In one example, the relation is determined by means of determining a difference between the channel quality of the serving cell and the best cell in the active set (AS) as $q_{best\ cell\ in\ As}-q_{serving\ cell}$. The determined relation is then compared with a second preset value CellChange Threshold$_{subnormal}$. The second preset value is smaller than the first preset value. Therefore, the requirement for triggering a cell changed is lowered if the channel quality has been determined to be low (in fourth step 384). The second preset value is in one example 2 dB. Thus, in one example, it is determined if $$q_{best\ cell\ in\ As}-q_{serving\ cell} > \text{CellChangeThreshold}_{normal}$$

If the relation between the channel quality of the best cell and the serving cell is such that the preset value is exceeded, then RNC is arranged to trigger the HS-DSCH serving cell change (sixth step 386 in FIG. 3). If on the other hand, the relation between the channel quality of the best cell and the serving cell is such that the second preset value is not exceeded, the procedure ends.

The predetermined quality value $q_{threshold}$ evaluated in the fourth step 384 can be determined in accordance with the following. The RNC provides the SIR of the minimum usable Transport Format Combination (TFC) for DL SRB transmission. Based on the maximum available HS-DSCH transmission power, the RNC is arranged to derive the minimum required CPICH Ec/Io for the minimum usable TFC. The minimum required CPICH Ec/Io for the minimum usable TFC is in one example used as a measure for the minimum required CPICH Ec/Io for signal radio bearer transmission. In one example, the RNC is arranged to determine the quality threshold value $q_{threshold}$ in accordance with the following formula.

$$q_{threshold} = q_{required} + \Delta$$

In one example, $\Delta$ is arranged to cover uncertainties such as delays for measurement and report, preparing and sending handover commands and HARQ retransmissions, etc.

In one example, $q_{required}$ required is determined in accordance with the following. The RNC is arranged to look up in the HS-DSCH TFC table based on the PDU size of the signal radio bearer so as to find the minimum usable TFC for signal radio bearer transmission and the minimum required SIR for said TFC.

The minimum required CPICH Ec/Io for signal radio bearer transmission can then be determined as $$q_{required} = Ec/Io_{require} = SIR_{HS\text{-}DSCH\_minTFC} - \text{lin2dB}(SF_{HS\text{-}DSCH}) + P_{CPICH} - P_{HS\text{-}DSCH,max}\ [dB]$$

Where $SIR_{HS\text{-}DSCH\_minTFC}$ is the required HS-DSCH Signal to Interference Ratio (SIR) for the minimum usable TFC, $SF_{HS\text{-}DSCH}$ is the spreading factor of HS-PDSCH, $P_{CPICH}$ is the CPICH power, $P_{DSCH,max}$ is the maximum available HS-DSCH power in the HS-DSCH serving cell, which can be evaluated in the RNC by the maximum cell power minus the non-HS-DSCH power.

The CPICH Ec/Io measurements are for example available in the radio network controller using any methods discussed above.

Figure 4:
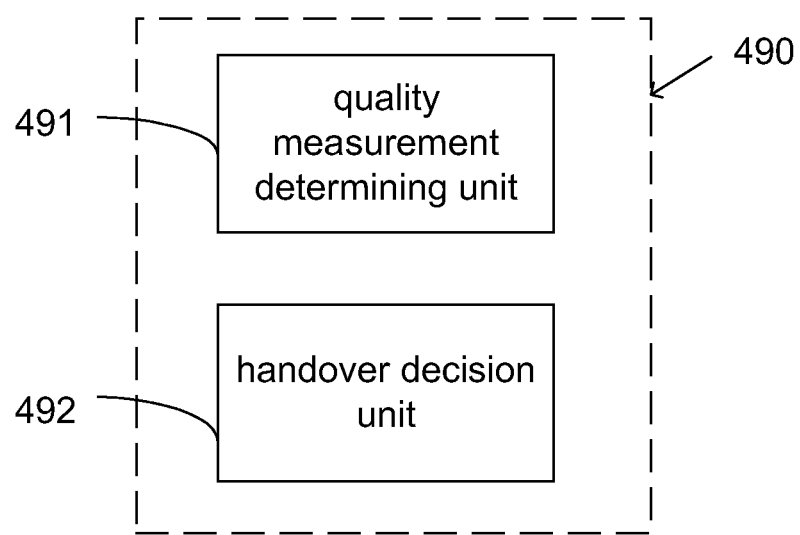
FIG. 4 is a block scheme illustrating an arrangement for performing handover decisions in an communication network.

In FIG. 4, an arrangement 490 for performing handover decisions in a communication network comprises a quality measurement determining unit 491 and a handover decision unit 492. The handover decisions are related to user equipment receiving packet data on a shared downlink traffic channel, such as HS DSCH, from a current serving cell. The quality measurement determining unit 491 is arranged to determine a quality measure of the shared downlink shared channel of the serving cell and at least one target cell. The handover decision unit 492 is arranged to determine a relation between the quality measure of the serving cell and the target cell, and to perform the handover decision based on said relation, and based on the size of the quality measure of the serving cell. In one example the arrangement is arranged to perform the procedure as described in relation to FIG. 3. The arrangement 490 is implemented in software, hardware, or a combination thereof. The arrangement is in one example implemented in the RNC of the RAN. Alternatively, the arrangement is implemented in Node B or a radio base station. The arrangement can also be implemented as a whole or partly in user equipment.

The invention claimed is:

1. A method for performing handover decisions in a communication network that are related to a user equipment receiving packet data on a shared downlink traffic channel from a current serving cell of the communication network, said method comprising
   determining quality measures respectively related to the shared downlink traffic channel of the serving cell and at least one target cell,
   determining a relation between the quality measures, and
   deciding whether to perform handover based on said determined relation and on the size of the quality measure related to the shared downlink traffic channel of the serving cell wherein deciding whether to perform handover comprises:
   deciding to perform handover if the determined relation exceeds a predetermined first threshold value, and
   if the determined relation does not exceed said predetermined first threshold value, deciding whether to perform the handover further based on the size of the quality measure related to the shared downlink traffic channel of the serving cell.

2. The method according to claim 1, wherein deciding whether to perform the handover based on the size of the quality measure related to the shared downlink traffic channel of the serving cell comprises deciding not to perform handover if the size of that quality measure exceeds a predetermined third threshold value.

3. The method according to claim 2, further comprising determining the predetermined third threshold value based on the quality of a High Speed Downlink Shared Channel (HS-DSCH).

4. The method according to claim 1, wherein deciding whether to perform the handover comprises deciding to perform handover if the determined relation exceeds a predetermined second threshold value, when the size of the quality measure related to the shared downlink traffic channel of the serving cell does not exceed a predetermined third threshold value.

5. The method according to claim 4, wherein the second threshold value is lower than the first threshold value.

6. The method according to claim 4, further comprising determining the predetermined third threshold value based on the quality of a High Speed Downlink Shared Channel (HS-DSCH).

7. The method according to claim 1, wherein determining said quality measures comprises determining the quality measures from measurement reports received from the user equipment.

8. The method according to claim 1, wherein determining said quality measures comprises determining the quality measures from a channel quality indicator (CQI) related to the user equipment.

9. The method according to claim 1, wherein the shared downlink traffic channel comprises a High Speed Downlink Shared Channel (HS-DSCH) in a Wideband Code Division Multiplex system.

10. An arrangement for performing handover decisions in a communication network that are related to a user equipment receiving packet data on a shared downlink traffic channel from a current serving cell, said arrangement comprising:
   a quality measurement determining circuit configured to determine quality measures respectively related to the shared downlink traffic channel of the serving cell and at least one target cell, and
   a handover decision circuit configured to determine a relation between the quality measures, and to decide whether to perform handover based on said determined relation and on the size of the quality measure related to the shared downlink traffic channel of the serving cell by:
   deciding to perform handover if the determined relation exceeds a predetermined first threshold value, and
   if the determined relation does not exceed said predetermined first threshold value, deciding whether to perform the handover also based on the size of the quality measure related to the shared downlink traffic channel of the serving cell.

11. The arrangement according to claim 10, wherein the handover decision circuit is configured to decide not to perform handover if the size of the quality measure related to the shared downlink traffic channel of the serving cell exceeds a predetermined third threshold value.

12. The arrangement according to claim 10, wherein handover decision circuit is configured to decide to perform handover if the determined relation exceeds a predetermined second threshold value, when the size of the quality measure related to the shared downlink traffic channel of the serving cell does not exceed a predetermined third threshold value.

13. The arrangement according to claim 12, wherein the second threshold value is lower than the first threshold value.

14. The arrangement according to claim 10, wherein the shared downlink traffic channel comprises a High Speed Downlink Shared Channel (HS-DSCH) in a Wideband Code Division Multiplex system.

15. The arrangement according to claim 10, wherein the arrangement comprises part of a Radio Network Controller.

16. The arrangement according to claim 10, wherein the arrangement comprises part of the user equipment.

17. The arrangement according to claim 10, wherein the arrangement comprises part of a Radio Access Network.

18. The method according to claim 1, wherein deciding whether to perform handover based on the size of the quality measure related to the shared downlink traffic channel of the serving cell comprises comparing that size to a predetermined threshold value and deciding whether to perform handover based on that comparison.

19. The arrangement according to claim 1, wherein the handover decision circuit is configured to decide whether to perform handover based on the size of the quality measure related to the shared downlink traffic channel of the serving cell by comparing that size to a predetermined threshold value and deciding whether to perform handover based on that comparison.

* * * * *

UNITED STATES PATENT AND TRADEMARK OFFICE
CERTIFICATE OF CORRECTION

PATENT NO. : 8,693,360 B2  Page 1 of 1
APPLICATION NO. : 12/999715
DATED : April 8, 2014
INVENTOR(S) : Liu et al.

It is certified that error appears in the above-identified patent and that said Letters Patent is hereby corrected as shown below:

In the Drawings

In Fig. 3, Sheet 2 of 3, delete " 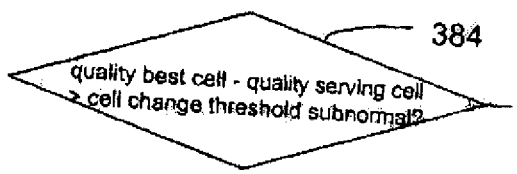 "

and insert -- 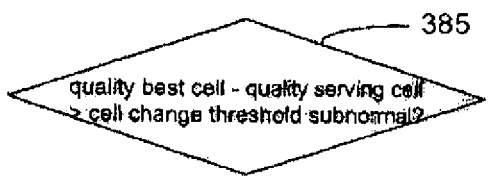 --, therefor.

In Fig. 3, Sheet 2 of 3, delete " 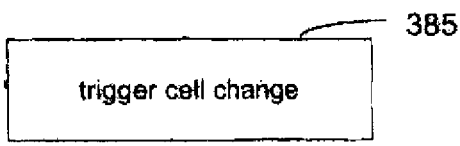 "

and insert -- 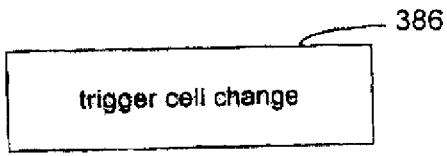 --, therefor.

In the Claims

In Column 8, Line 25, in Claim 19, delete "claim 1," and insert -- claim 10 --, therefor.

Signed and Sealed this
Thirtieth Day of September, 2014

Michelle K. Lee
*Deputy Director of the United States Patent and Trademark Office*